US006787740B2

(12) United States Patent
Smith et al.

(10) Patent No.: US 6,787,740 B2
(45) Date of Patent: Sep. 7, 2004

(54) INTEGRALLY BLADED ROTOR AIRFOIL FABRICATION AND REPAIR TECHNIQUES

(75) Inventors: Michael P. Smith, Glastonbury, CT (US); Janet Stanley, East Hampton, CT (US); David S. Murphy, Southington, CT (US); Robert W. Baumgarten, Cromwell, CT (US); Thomas DeMichael, Stafford Springs, CT (US); Stephen L. Mayers, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/227,208

(22) Filed: Aug. 23, 2002

(65) Prior Publication Data

US 2002/0195176 A1 Dec. 26, 2002

Related U.S. Application Data

(62) Division of application No. 09/836,009, filed on Apr. 17, 2001, now Pat. No. 6,536,110.

(51) Int. Cl.$^7$ ................................................. H05B 3/00
(52) U.S. Cl. ..................... 219/535; 219/529; 29/889.21; 29/889.22
(58) Field of Search ................................. 219/535, 529, 219/549; 338/208; 29/889.21, 889, 889.22, 889.2

(56) References Cited

U.S. PATENT DOCUMENTS

| | | | | |
|---|---|---|---|---|
| 1,036,632 A | * | 8/1912 | Jahr ............................ | 338/208 |
| 1,436,384 A | * | 11/1922 | Craddick et al. ........... | 338/208 |
| 1,703,005 A | * | 2/1929 | Hewitt ........................ | 219/529 |
| 2,932,719 A | * | 4/1960 | Godden ....................... | 338/208 |
| 3,049,465 A | * | 8/1962 | Wilkins ....................... | 219/528 |
| 3,393,297 A | * | 7/1968 | Hart ............................ | 219/528 |
| 3,425,020 A | * | 1/1969 | Toyooka et al. ............ | 219/529 |
| 3,484,585 A | * | 12/1969 | Morey ......................... | 219/529 |
| 4,113,518 A | | 9/1978 | Henderson | |
| 4,214,921 A | | 7/1980 | Henderson | |
| 4,352,707 A | * | 10/1982 | Wengler et al. ............. | 156/359 |
| 4,479,293 A | | 10/1984 | Miller et al. | |
| 4,503,314 A | | 3/1985 | Kakimi et al. | |
| 4,566,810 A | | 1/1986 | Yoshioka et al. | |
| 4,611,744 A | | 9/1986 | Fraser et al. | |
| 4,613,744 A | * | 9/1986 | Fraser ......................... | 219/200 |
| 4,778,345 A | | 10/1988 | Ito et al. | |

(List continued on next page.)

FOREIGN PATENT DOCUMENTS

| | | |
|---|---|---|
| DE | 19831736 | 2/2000 |
| EP | 0 392 656 | 10/1990 |
| EP | 0 525 975 | 2/1993 |
| EP | 0 683 242 | 11/1995 |
| EP | 0 980 961 | 2/2000 |
| FR | 2 631 268 | 11/1989 |
| GB | 2110909 | * 6/1983 |
| JP | 62-238843 | * 10/1987 |
| JP | 11-242991 | * 9/1999 |

*Primary Examiner*—John A. Jeffery
(74) *Attorney, Agent, or Firm*—Bachman & LaPointe, P.C.

(57) ABSTRACT

The present invention relates to a method for fabricating an integrally bladed rotor which comprises providing a hub section, preferably formed from a titanium based alloy, and welding an airfoil, also preferably formed from a titanium based alloy, to the hub section. The method further comprises partially aging and cooling the hub section prior to welding and aging the airfoil and the weld joint between the airfoil and the hub section subsequent to welding. The post welding aging step is preferably carried out using a novel encapsulated local airfoil heating device having a plurality of heating elements woven into a jacket made from a high temperature cloth material. The method of the present invention may also be used to repair integrally bladed rotors.

9 Claims, 4 Drawing Sheets

U.S. PATENT DOCUMENTS

| | | |
|---|---|---|
| 4,820,124 A | 4/1989 | Fried |
| 4,841,614 A | 6/1989 | MacNitt et al. |
| 4,931,253 A | 6/1990 | Eylon et al. |
| 4,934,583 A | 6/1990 | Patsfall |
| 5,183,632 A | 2/1993 | Kiuchi et al. |
| 5,185,045 A | 2/1993 | Peters et al. |
| 5,306,897 A * | 4/1994 | Fraser .................. 219/535 |
| 5,484,983 A * | 1/1996 | Roell .................. 219/529 |
| 5,489,194 A | 2/1996 | Yoshinari et al. |
| 5,609,471 A | 3/1997 | Frasier et al. |
| 5,620,308 A | 4/1997 | Yoshinari et al. |
| 5,716,468 A | 2/1998 | Tanaka et al. |
| 5,735,046 A | 4/1998 | Frasier et al. |
| 5,817,192 A | 10/1998 | Kawai et al. |
| 6,127,044 A | 10/2000 | Yamamoto et al. |
| 6,129,514 A | 10/2000 | Shiga et al. |
| 6,164,917 A | 12/2000 | Frasier et al. |
| 6,174,132 B1 | 1/2001 | Shiga et al. |
| 6,305,078 B1 | 10/2001 | Shiga et al. |

* cited by examiner

INTEGRALLY BLADED ROTOR AIRFOIL FABRICATION AND REPAIR TECHNIQUES

CROSS REFERENCE TO RELATED APPLICATION(S)

This application is a divisional application of U.S. patent application Ser. No. 09/836,009, filed Apr. 17, 2001, now U.S. Pat. No. 6,536,110, entitled INTEGRALLY BLADED ROTOR AIRFOIL FABRICATION AND REPAIR TECHNIQUES to Michael P. Smith et al.

BACKGROUND OF THE INVENTION

The present invention relates to a method for fabricating/repairing an integrally bladed rotor and a novel encapsulated local airfoil heating device used in the method.

The increasing use of integrally bladed rotor hardware in large, high performance gas turbine engines is driven by the demand for improvements in performance and efficiency. In conventional rotors, rotating airfoils are retained by dovetail slots broached into the rim of a disk. In an integrally bladed rotor, the airfoils and disk form one continuous piece of metal. The weight and fuel savings afforded by integrally bladed rotors result from their ability to retain rotating airfoils with less disk mass than would be required in a conventionally designed rotor. Furthermore, the reduced disk mass of an integrally bladed rotor disk permits weight reduction in other components which react upon or obtain a reaction from the rotors, i.e. shafts, hubs, and bearings.

In the past, a major disadvantage associated with the use of integrally bladed rotors in large gas turbine engines has been the lack of a reliable method for repairing integrally bladed rotor airfoils that have been damaged beyond blendable limits. Because the airfoils are integral with the disk, damage to airfoils beyond blendable limits requires the removal of the entire rotor from service and replacement with a new integrally bladed rotor, at significant expense.

Other problems associated with integrally bladed rotors relate to the fabrication method employed to manufacture them. They can be machined out of a single large forging; however, this approach is not desirable. A large forging, e.g., large billet, has lower property capability and a significant amount of the starting material, which can be very expensive depending upon the material, is machined away. Also, the part is at risk of scrap out due to inevitable machining errors during manufacture. Another approach for manufacturing integrally bladed rotors is to attach separately forged airfoils to a rotor by a bonding process.

A titanium alloy consisting essentially of 6.0 wt. % aluminum, 2.0 wt. % tin, 4.0 wt. % zirconium, 6.0 wt. % molybdenum, and the balance essentially titanium is a desirable alloy for integrally bladed rotors due to its high toughness, its tensile and fatigue strength, and its good weldability. It is however a difficult alloy to process after welding because of the nature of the weld zone microstructure which is an orthorhombic martensite. First, the OEM friction weld must be post weld heat treated to stabilize the microstructure and relieve stresses. Secondly, the integrally bladed rotor must be able to undergo subsequent in-service weld repairs due to foreign object damage. While weld properties can be restored with full solution plus age post weld heat treatment, it is impractical to perform this operation due to possible airfoil distortion and surface contamination, especially for non-OEM welds. The current post weld heat treatment of 1100° F. for 2–6 hours results in a very hard weld zone with low impact strength compared to parent metal and inadequate fatigue crack propagation capability. The post weld heat treatment could be raised to a 1300° F. average temperature for up to two hours to restore acceptable weld zone impact and toughness properties; however, this treatment results in a 4–6% loss in tensile strength over the baseline condition. Such a loss is unacceptable for many highly stressed parts.

SUMMARY OF THE INVENTION

Accordingly, it is an object of the present invention to provide an improved method for fabricating and/or repairing integrally bladed rotors.

It is a further object of the present invention to provide a method which allows use of a high temperature post weld heat treatment while maintaining high tensile and fatigue strength.

It is a further object of the present invention to provide a novel encapsulated local airfoil heating device to perform said high temperature post weld heat treatment.

In accordance with a first aspect of the present invention, a method for creating an integrally bladed rotor broadly comprises providing a hub section, preferably formed from a titanium based alloy, and welding an airfoil, also preferably formed from a titanium based alloy, to the hub section. Prior to welding, the hub section and airfoil may be solution treated, oil quenched, partially aged and cooled prior to welding. The method further comprises applying a high temperature post weld average heat treatment to the weld joint between the hub section and the airfoil subsequent to welding.

A novel encapsulated local airfoil heating device is used to perform the post weld average heat treatment. The device broadly comprises a plurality of heating elements woven into a jacket made from a high temperature cloth material. The heating device is placed over the airfoil and the weld joint to perform the post weld heat treatment.

A method for repairing integrally bladed rotors in accordance with the present invention broadly comprises machining away a damaged portion of an integrally bladed rotor airfoil and welding an undamaged airfoil section to a remaining portion of the integrally bladed rotor airfoil. This is followed by placing the encapsulated local airfoil heating device over the undamaged airfoil and the weld and performing the post mold heat treatment to relieve residual stresses and restore microstructure and mechanical properties to the weld joint and adjacent metal.

Other details of the fabricating/repairing methods and the encapsulated local airfoil heating device, as well as other object and advantages attendant thereto, are set forth in the following description and the accompanying drawings wherein like reference numerals depict like elements.

DETAILED DESCRIPTION OF THE PREFERRED EMBODIMENT(S)

Figure 1:
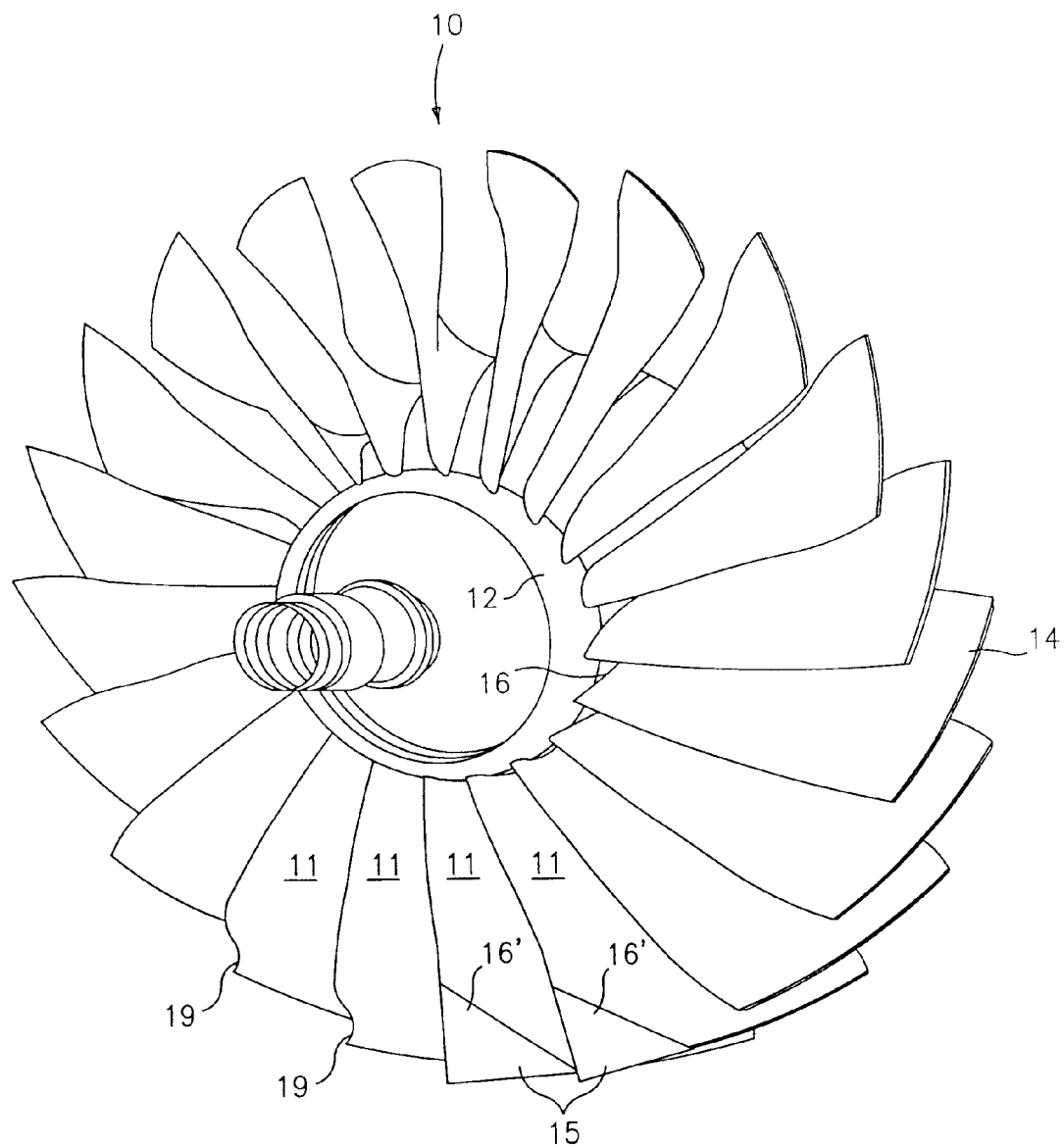
FIG. 1 is a schematic representation of an integrally bladed rotor having an airfoil welded to a hub section.

Referring now to the drawings, FIG. 1 illustrates an integrally bladed rotor 10 having a hub section 12 and an airfoil 14 welded to the hub section along a weld joint 16 and airfoil sections 15 welded to undamaged airfoil portions 11 along weld lines 16'. FIG. 1 also shows certain airfoils 11 having damaged tip portions 19 which require repair. The hub section 12, the airfoils 14, and the airfoil sections 15 may be formed using any suitable technique known in the art. The hub section 12, each of the airfoils 11, 14, and 17, and the airfoil sections 15 may be formed from a titanium based alloy. Suitable titanium based alloys include a titanium based alloy consisting essentially of 6.0 wt. % aluminum, 2.0 wt. % tin, 4.0 wt. % zirconium, 6.0 wt. % molybdenum, and the balance essentially titanium (TI-6246); a titanium based alloy consisting essentially of 6.0 wt. % aluminum, 2.0 wt. % tin, 4.0 wt. % zirconium, 2.0 wt. % molybdenum, and the balance essentially titanium (TI-6242); and a titanium based alloy consisting essentially of 6.0 wt. % aluminum, 4.0 wt. % vanadium, and the balance essentially titanium (TI-64). While titanium alloys are preferred, the methods described herein could be used with hub sections, airfoils, and airfoil sections formed from nickel based alloys such as Inco 718. The hub section 12, the airfoils 11, 14, and 17, and/or the airfoil sections 15 can be formed from the same alloy or from different alloys.

The weld joint 16 may be formed using any suitable welding technique known in the art. For example, each airfoil 14 could be welded to the hub section 12 using a friction welding technique such as OEM friction welding.

Prior to welding, the hub section 12 and each airfoil 14 may be solution treated and oil quenched. For example, if the hub section 12 and/or airfoil 14 are formed from a TI 6246 alloy, solution treatment and oil quenching are performed. The solution treatment and oil quenching treatment may be performed by first heating the hub section 12 and airfoil 14 to a temperature in the range of from about 1620° F. to about 1655° F. for a time in the range of from about 1 hour to 4 hours. The solution and oil quenching treatment may be carried out in an electric furnace with air or argon atmosphere. The hub section 12 and/or the airfoil 14 may be in a suitable rack or fixture for transference to an oil tank (not shown) in a timely manner with minimal delay. Alternatively, a vacuum furnace with oil quench capability may be used to perform the solution treatment. After the oil quenching step has been completed, the hub section 12 and the airfoils(s) 14 may be subjected to a partial aging treatment at a temperature in the range of from about 1075° F. to about 1125° F. for a time in the range of from about 2 hours to about 8 hours. The partial aging treatment may be carried out using any suitable furnace known in the art having any suitable atmosphere. Following partial aging, the hub section 12 and the airfoil(s) 14 may be cooled at a rate of about 40° F. to 100° F. per minute.

As mentioned before, to fabricate an integrally bladed rotor 10, each airfoil 14 is welded to the hub section 12. After welding has been completed, the hub section 12 and the weld joint 16 between the airfoil 14 and the hub section 12 is subjected to an over-aging post weld heat treatment during which the weld joint 16 is heated to a temperature in the range of 1275° F. to 1325° F. in an inert gas atmosphere for a time period in the range of 1 to 4 hours. After the post weld heat treatment, the airfoil 14 and the weld joint 16 are cooled at a rate of from about 40° F. to about 100° F. per minute.

Figure 2:
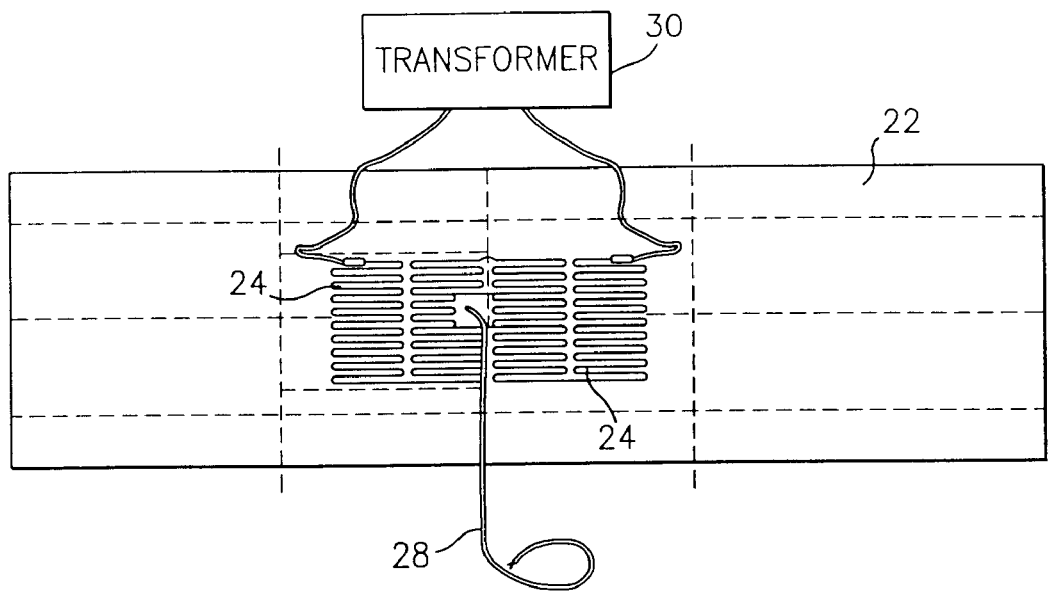
FIG. 2 is a schematic representation of an encapsulated local airfoil heating device in accordance with the present invention.

In accordance with the present invention, the post weld heat treatment is preferably carried out using a novel encapsulated local airfoil heating device 20 such as that shown in FIG. 2. The heating device 20 comprises a jacket or a sock 22 formed from a ceramic insulating material such as a high temperature aluminoborsilicate-based fabric. The jacket or sock 22 serves a dual purpose. First, it concentrates heat generated by the device 20 at the airfoil surface and allows the weld joint 16 and the surrounding heat affected zone to reach and stabilize at the intended post weld heat treatment temperature. Second, the jacket 22 prevents unintentional heating of adjacent airfoils.

The device 20 has a plurality of radiant resistance heated elements 24 woven into the fabric of the jacket 22. The heating elements 24 preferably comprise high watt density heating wires. The heating elements 24 serve to radiate heat directly to the airfoil surface. The heating elements 24 may be arranged in individually controlled heating element zones. For example, the device 20 could have four individually controlled heating element zones.

A titanium gettering sheet 26 in foil form is also woven into the fabric of the jacket 22 to prevent local atmospheric contamination and to allow further temperature control capability in the zoned heating device 20.

The device 20 further includes a plurality of non-contact thermocouple wires 28 woven into the fabric of the jacket 22. The thermocouple wires 28 are used to allow precise temperature control during the post weld heat treatment cycle. A variable transformer 30 is connected to the heating elements 24 in each heating zone and supplies power to the heating elements. The transformer 30 may be used to vary the current supplied to the heating elements 24 in each temperature zone as a function of the temperature sensed by the thermocouple wires 28.

Figure 3:
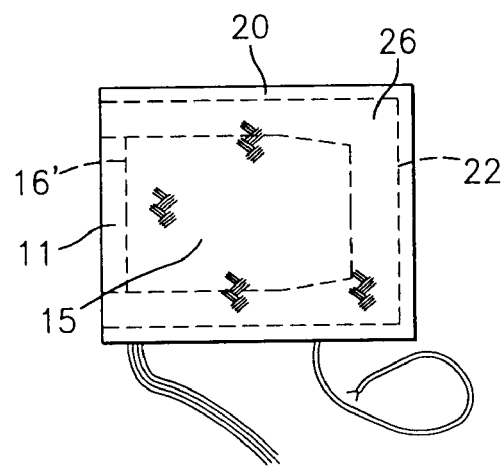
FIG. 3 is a schematic representation of the heating device of FIG. 2 positioned over an airfoil and weld joint.

The device 20 is used as shown in FIG. 3 by placing the device 20 over the airfoil 14 and the weld joint 16. Power is then supplied to the radiant heating elements 24 so that heat is applied to the weld joint 16 at the aforesaid post weld heat treatment temperature. The power is continued for a time in the aforesaid post weld heat treatment time range.

The same basic method used to fabricate an integrally bladed rotor 10 can be used to refurbish a damaged integrally bladed rotor. To repair an integrally bladed rotor, a damaged portion 19 of a rotor airfoil 11 is first machined away using any suitable machining technique known in the art. Thereafter, an undamaged airfoil section 15 is welded to the remaining airfoil portion 11 of the integrally bladed rotor airfoil. Any suitable welding technique known in the art such as a friction welding technique may be used to weld the airfoil section 15 to the portion 11. The undamaged airfoil section 15 may be from any of the abovementioned titanium based alloys or a nickel based alloy.

The heating device 20 is then placed over the undamaged airfoil 15 and the weld joint 16' and energized to perform the aforementioned post weld heat treatment at a temperature in the range of 1275° F. to 1325° F. for a time in the range of 1 to 4 hours in an inert gas environment. Following the post weld heat treatment, the undamaged airfoil 15 and the weld joint 16' are cooled at a rate of from about 40° F. to about 100° F. per minute.

Following the post weld heat treatment, the undamaged airfoil section 15 is machined to obtain a required geometry.

The heating device 20 of the present invention is advantageous in that it provides focused, local heating so that adjacent airfoils and the disk hub on the integrally bladed rotor are kept well below temperatures that would result in a strength debit and/or dimensional distortion. At the same time, the heating device 20 provides the required temperature and time duration required for post weldment stress relief of a superalloy airfoil material.

Figure 4:
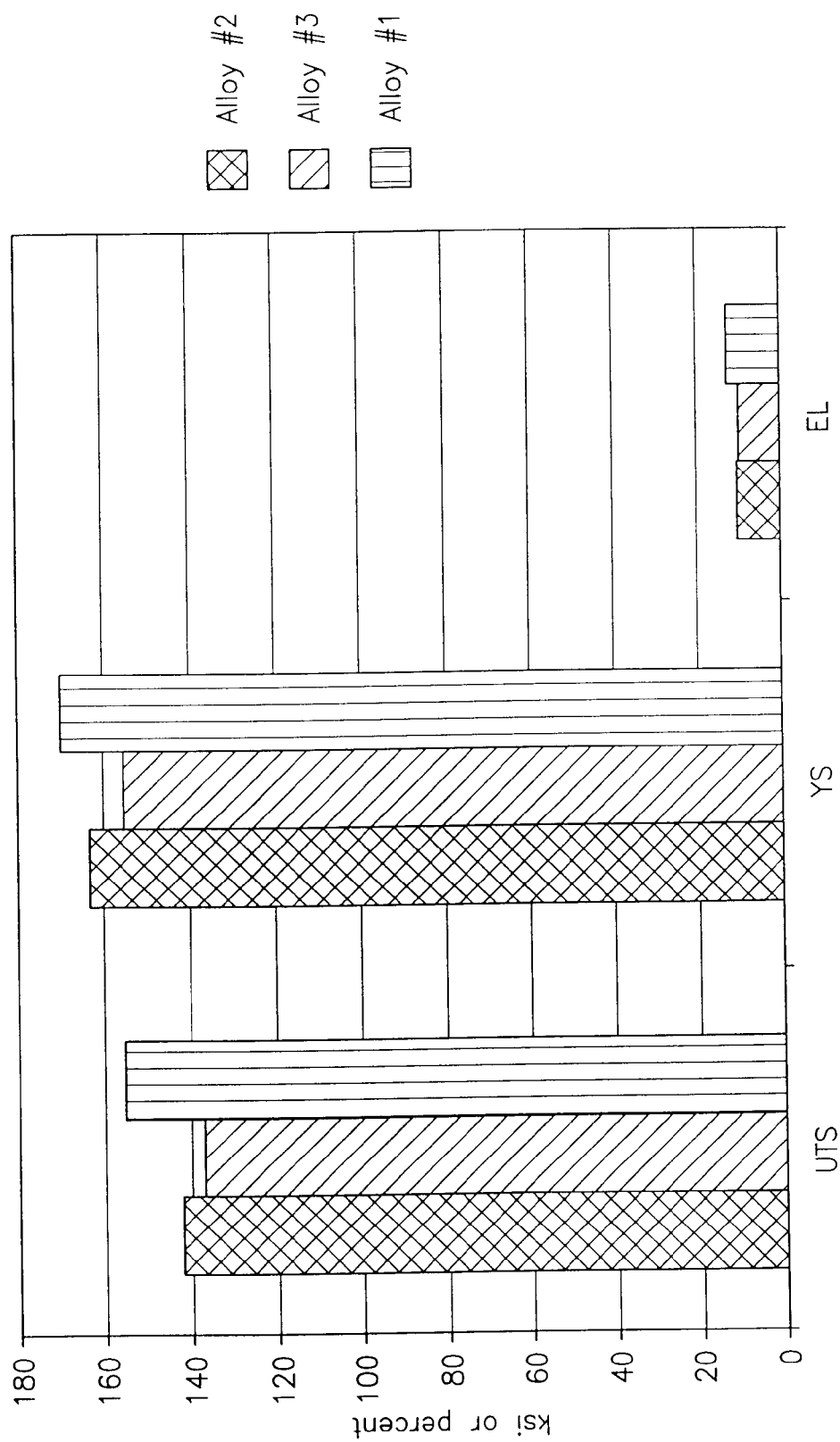
FIGS. 4 and 5 are graphs illustrating the improvements obtained using the fabricating/repairing method of the present invention.
Figure 5:
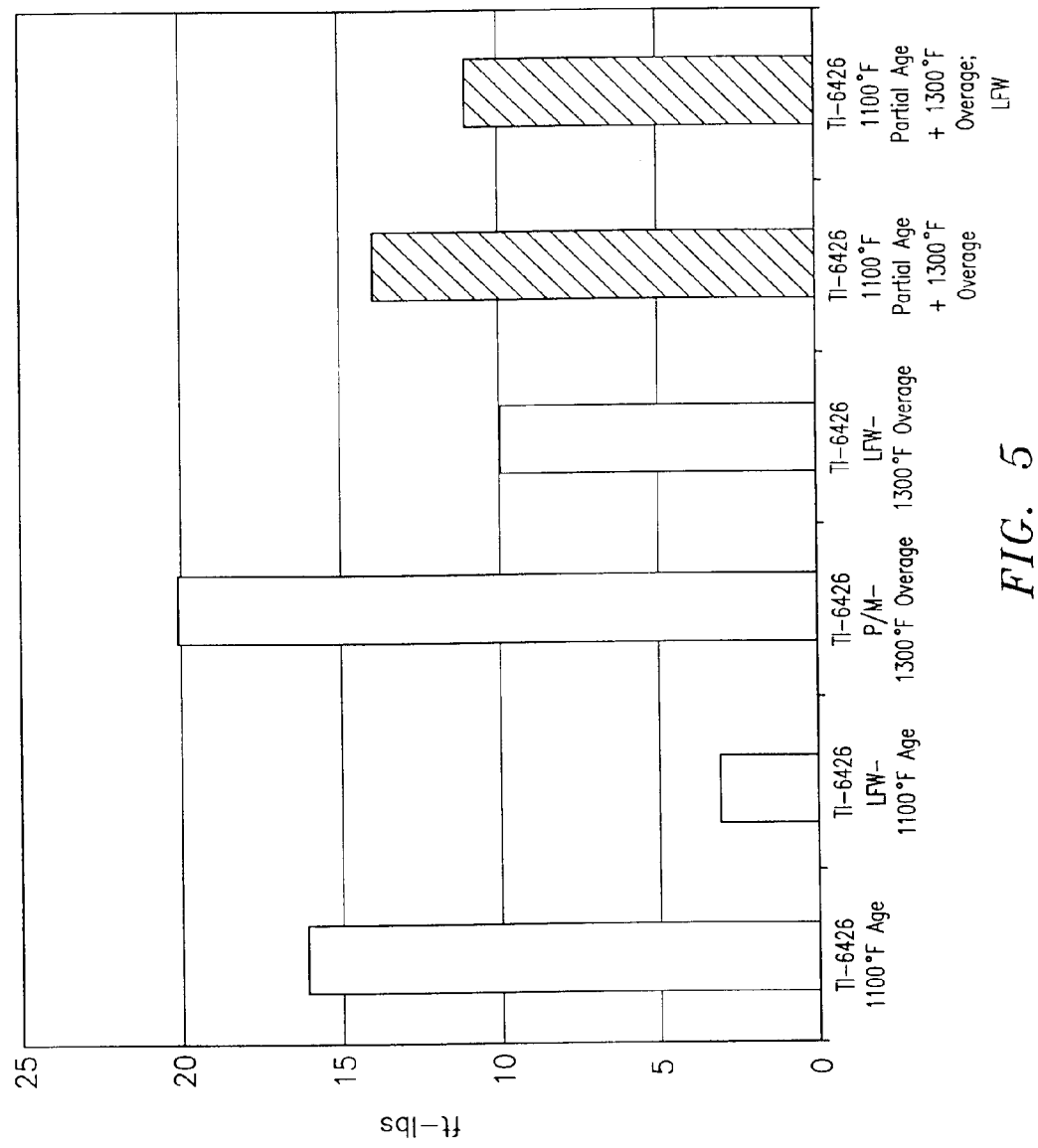

Referring now to FIGS. 4 and 5, the graphs illustrate how the method of the present invention eliminates parent metal (P/M) strength debit and the alloy toughness matches the baseline. As shown in FIG. 4, the ultimate tensile strength, yield strength, and elongation properties of a Ti-6Al-2Sn-4Zr-6Mo alloy from which an integrally bladed rotor can be formed and which has been subjected to solution treatment, oil quenching, partial aging at 1100° F. and over-aged at 1300° F. (alloy no. 1) are better as compared to the same alloy which has been solution treated, air cooled and aged at 1100° F. (alloy no. 2) and to the same alloy which has been solution treated, air cooled and aged at 1300° F. (alloy no. 3). FIG. 5 illustrates the effect of the method of the present invention on the charpy impact strength of a Ti-6Al-2Sn-4Zr-6Mo alloy used for the disk section of an integrally bladed rotor.

While the heating device 20 has been described in the context of treating integrally bladed rotors formed from a titanium based material, it can be used to treat integrally bladed rotors and airfoils formed from other materials such as a nickel-based superalloy.

It is apparent that there has been provided in accordance with the present invention integrally bladed rotor airfoil fabrication and repair techniques which fully satisfy the means, objects, and advantages set forth hereinbefore. While the present invention has been described in the context of specific embodiments thereof, other alternatives, modifications, and variations will become apparent to those skilled in the art having read the foregoing description. Therefore, it is intended to embrace such alternatives, modifications, and variations as fall within the broad scope of the appended claims.

What is claimed is:

1. A device for performing localized heat treatment of integrally bladed rotor airfoils comprising:
   a jacket placed over one of said airfoils;
   a plurality of heating elements woven into said jacket; and
   means for preventing unintentional heating of adjacent ones of said airfoils, said preventing means being woven into said jacket.

2. A device according to claim 1, wherein said jacket is formed from a ceramic insulating material.

3. A device according to claim 1, wherein said jacket is formed from a high temperature aluminoborsilicate based fabric.

4. A device according to claim 1, wherein said heating elements are high watt density heating wires and said jacket serves to concentrate heat generated by said heating elements at a surface of said airfoil and to allow a weld joint between said airfoil and a hub and a heat affected zone to reach and stabilize at a post weld heat treatment temperature.

5. A device according to claim 1, further comprising thermocouple wires woven into said jacket to control heating of said airfoil during a post weld heat treatment.

6. A device according to claim 1, further comprising a variable transformer connected to said heating elements for varying electrical power supplied to said heating elements and airfoil temperature profile.

7. A device for performing localized heat treatment of integrally bladed rotor airfoils comprising:
   a jacket placed over one of said airfoils;
   a plurality of heating elements woven into said jacket;
   a material which prevents unintentional heating of adjacent airfoils woven into said jacket; and
   said material being a titanium getting sheet material.

8. A device for performing localized heat treatment of integrally bladed rotor airfoils comprising:
   a jacket placed over one of said airfoils;
   a plurality of heating elements woven into said jacket;
   said heating elements arranged in individually controlled heating element zones; and
   means for preventing unintentional heating of adjacent airfoils woven into said jacket.

9. A device for performing localized heat treatment of integrally bladed rotor airfoils comprising:
   a jacket formed from a fabric material, said jacket being placed over one of said airfoils;
   a plurality of heating elements woven into the jacket for concentrating heat at an airfoil surface and allowing a weld joint and a surrounding heat affected zone to reach and stabilize at a post weld heat treatment temperature; and
   means for preventing unintentional heating of adjacent ones of said airfoils during said post weld heat treatment, said preventing means being woven into the fabric of said jacket.

* * * * *